US009716628B2

(12) United States Patent
Sikand et al.

(10) Patent No.: US 9,716,628 B2
(45) Date of Patent: Jul. 25, 2017

(54) TOUCHLESS ORCHESTRATION FOR LAYER 3 DATA CENTER INTERCONNECT IN COMMUNICATIONS NETWORKS

(71) Applicant: CISCO TECHNOLOGY, INC., San Jose, CA (US)

(72) Inventors: Vrishabha Sikand, Lexington, MA (US); Liqin Dong, San Jose, CA (US); Sachin Vijay Vishwarupe, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 487 days.

(21) Appl. No.: 14/286,891

(22) Filed: May 23, 2014

(65) Prior Publication Data

US 2015/0341220 A1   Nov. 26, 2015

(51) Int. Cl.
  *H04L 12/46*   (2006.01)
  *H04L 12/24*   (2006.01)
  *H04L 12/713*  (2013.01)
  *H04L 12/751*  (2013.01)
  *H04L 12/26*   (2006.01)

(52) U.S. Cl.
  CPC ...... *H04L 41/0886* (2013.01); *H04L 12/4633* (2013.01); *H04L 12/4641* (2013.01); *H04L 41/084* (2013.01); *H04L 41/0809* (2013.01); *H04L 41/0853* (2013.01);
  (Continued)

(58) Field of Classification Search
  None
  See application file for complete search history.

(56) References Cited

U.S. PATENT DOCUMENTS 6,704,795 B1 * 3/2004 Fernando ............... H04L 45/02
                                              709/237
7,486,659 B1 * 2/2009 Unbehagen ......... H04L 12/4633
                                              370/351
(Continued)

FOREIGN PATENT DOCUMENTS

WO   WO2015/179813   11/2015

OTHER PUBLICATIONS

PCT—Jul. 30, 2015 International Search Report from International Application Serial No. PCT/US2015/032260.
(Continued)

*Primary Examiner* — Gregory Sefcheck
*Assistant Examiner* — Jenkey Van
(74) *Attorney, Agent, or Firm* — Patent Capital Group

(57) ABSTRACT

A method is provided in one example embodiment and includes receiving from an orchestrator element for a new Virtual Routing and Forwarding element ("VRF") created in a communications network a name of the VRF and interconnect identification; selecting a border element for the VRF; and creating in a database a VRF entry for the selected border element, the entry identifying a configuration profile for the selected border element. The method further includes forwarding a VRF create notification to the selected border element; and providing the configuration profile from the corresponding entry to the selected border element in response to a query to the database from the selected border element. The selected border element applies the configuration profile automatically to configure the selected border element.

13 Claims, 5 Drawing Sheets

(52) U.S. Cl.
CPC ............ *H04L 45/02* (2013.01); *H04L 45/586* (2013.01); *H04L 43/0817* (2013.01); *H04L 43/0876* (2013.01)

(56) References Cited

U.S. PATENT DOCUMENTS

| | | | |
|---|---|---|---|
| 8,179,905 B1* | 5/2012 | Napierala | H04L 12/4641 370/237 |
| 8,953,590 B1* | 2/2015 | Aggarwal | H04L 12/4675 370/389 |
| 9,356,886 B2* | 5/2016 | Yang | H04L 41/0813 |
| 2008/0002697 A1* | 1/2008 | Anantharamaiah | H04L 12/14 370/392 |
| 2008/0031157 A1* | 2/2008 | Tamboise | H04L 41/08 370/254 |
| 2011/0075667 A1* | 3/2011 | Li | H04L 12/4633 370/392 |
| 2011/0075674 A1* | 3/2011 | Li | H04L 12/5695 370/401 |
| 2011/0149980 A1* | 6/2011 | Patel | H04L 12/4641 370/401 |
| 2011/0231543 A1* | 9/2011 | Akazawa | H04L 41/0806 709/224 |
| 2012/0147894 A1* | 6/2012 | Mulligan | G06F 9/45533 370/395.53 |
| 2014/0108486 A1 | 4/2014 | Borzycki | |
| 2014/0108538 A1 | 4/2014 | Borzycki | |
| 2014/0108558 A1 | 4/2014 | Borzycki | |
| 2014/0108599 A1 | 4/2014 | Borzycki | |
| 2014/0108792 A1 | 4/2014 | Borzycki | |
| 2014/0123265 A1 | 5/2014 | Borzycki | |
| 2015/0092785 A1* | 4/2015 | Torvi | H04L 45/04 370/401 |
| 2015/0103692 A1 | 4/2015 | Jain et al. | |

OTHER PUBLICATIONS

Ardica, Max, "Cisco Next Generation Fabric (Dynamic Fabric Automation Architecture)," Tomorrow Starts Here—Cisco Live!, Jun. 26, 2013; 52 pages http://www.valleytalk.org/wp-content/uploads/2013/08/ciscoDFA.pdf.

"Cisco Dynamic Fabric Automation Technology: Overview and Deployment Considerations What you will Learn Function Platform I/O Module Minimum Software Version," Cisco White Paper, Cisco Systems, Inc., DFA Spine Cisco Nexus 7700 Series Cisco Nexus F3 Module Release 6, May 20, 2014, 23 pages www.cisco.com/c/en/us/solutions/collateral/data-center-virtualization/unified-fabric/white-paper-c11-731098.pdf.

Moreno, V., et al., "LISP Deployment Considerations in Data Center Networks," Network Working Group, Internet Engineering Task Force Internet Draft, draft-moreno-lisp-datacenter-deployment-00-txt, Feb. 14, 2014, 20 pages.

Fang, Luyuan, et al., "BGP/MPLS IP VPN Data Center Interconnect," Internet Engineering Task Force, Working Draft, draft-fang-L3VPN-data-center-interconnect-02.txt, Oct. 21, 2013, 12 pages.

U.S. Appl. No. 13/921,083, filed Jun. 18, 2013, entitled "Physical Network Orchestration for Data Centers," Inventor(s): Vipin Jain, et al.

PCT Nov. 29, 2016 International Preliminary Report on Patentability from International Application PCT/US2015/032260; 8 pages.

* cited by examiner

| | Vrf NAME = RED | NODE IP = 20.1.1.2 | TENANT = RED, ROLE = DCI, Dot1q = 1000, IF = eth2/4.1000, ip = 20.1.1.2, MASK = 24, BGP PEER = 20.1.1.1, AS = 1, IPv4 AFI = 1, *VPN ID = 10,000, VNI = 5000, profile_name,* GLOBAL_RSVD_AS |
|---|---|---|---|
| 120 | | | |
| 122 | Vrf NAME = RED | NODE IP = 20.1.1.1 | TENANT = RED, ROLE = BL, Dot1q = 1000, IF = eth2/4.1000, ip = 20.1.1.1, MASK = 24, BGP PEER = 20.1.1.2, AS = 2, IPv4 AFI = 1 *VPN ID = 10,000, VNI = 5000, profile_name,* GLOBAL_RSVD_AS |

FIG. 5

TOUCHLESS ORCHESTRATION FOR LAYER 3 DATA CENTER INTERCONNECT IN COMMUNICATIONS NETWORKS

TECHNICAL FIELD

This disclosure relates in general to data communications networks and, more particularly, to techniques for touchless orchestration for layer 3 ("L3") data center interconnect ("DCI") in such networks.

BACKGROUND

Dynamic Fabric Automation, also referred to as "DFA," is a network fabric architecture for facilitating data center networking. The physical topology of DFA is based on a two-tier fat tree, also known as a Clos network, in which a plurality of leaf nodes (which may be implemented as Top of Rack ("ToR") switches or routers) connects to each of a plurality of spine nodes (implemented as switches or routers) and vice versa. DFA fabrics communicate with other DFA fabrics and with the Internet through one or more border leaf ("BL") nodes. For BL nodes that do not support Data Center Interconnect ("DCI") functionalities, such as Multiprotocol Label Switching/Virtual Private Networking ("MPLS/VPN"), Layer 2 VPN ("VPLS"), and/or Overlay Transport Virtualization ("OTV"), a separate DCI node must be connected to the BL node, a solution commonly referred to as a "two box solution."

Currently, if a tenant endpoint is to have L3 connectivity to endpoints in the same Virtual Routing and Forwarding element ("VRF") in another fabric, whether or not the other fabric is geographically collocated, the information must be manually configured at the BL node and the DCI node, which is a cumbersome and error-prone process.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5 illustrates example asset data base entries corresponding to a DCI node and a BL node in accordance with features of an embodiment.

DETAILED DESCRIPTION OF EXAMPLE EMBODIMENTS

Overview

Figure 1:
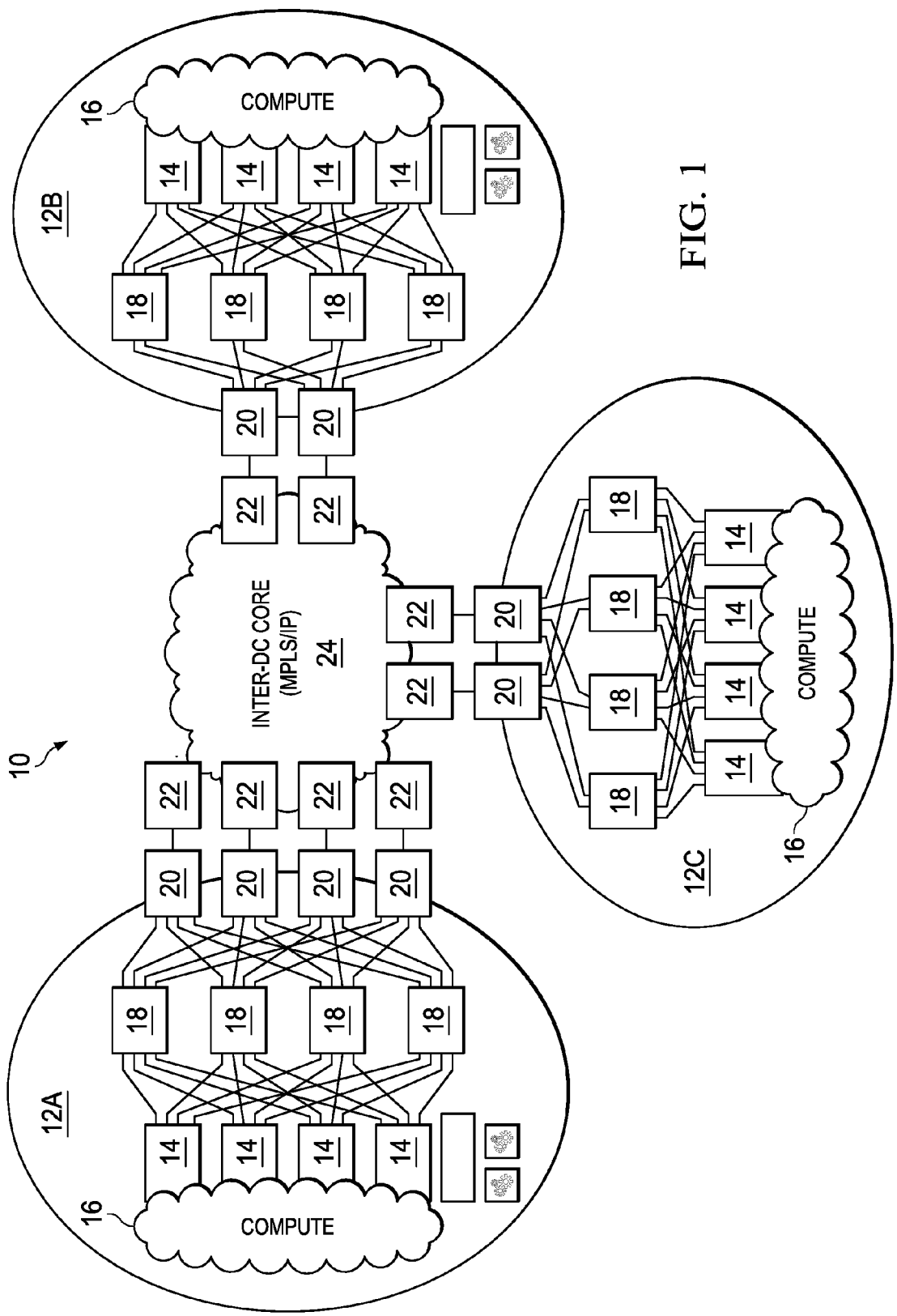
FIG. 1 is a simplified block diagram illustrating an example deployment of a system for implementing touchless orchestration for L3 DCI in a communications network in accordance with features of an embodiment.

A method is provided in one example embodiment and includes receiving from an orchestrator element for a new Virtual Routing and Forwarding element ("VRF") created in a communications network a name of the VRF and interconnect identification; selecting a border element for the VRF; and creating in a database a VRF entry for the selected border element, the entry identifying a configuration profile for the selected border element. The method further includes forwarding a VRF create notification to the selected border element; and providing the configuration profile from the corresponding entry to the selected border element in response to a query to the database from the selected border element. The selected border element applies the configuration profile automatically to configure the selected border element. The method may further include allocating a network identifier to the VRF. In some embodiments, the selected border element comprises a border leaf node comprising Data Center Interconnect ("DCI") functionality, while in other embodiments, the selected border element comprises a border leaf node/DCI node pair.

The creating an entry for the selected border element may include creating an entry for each node of the border leaf node/DCI node pair, in which each of the entries identifies a configuration profile for a respective one of the nodes of the border leaf node/DCI node pair. Moreover, the providing the configuration profile may include providing the respective configuration profile to each of the nodes of the border leaf node/DCI node pair. In one embodiment, the VRF create notification includes the VRF name and a node ID. Additionally, the query may include the VRF name and node ID.

Example Embodiments

Multi-tenancy is an important feature for DFA fabric. Tenant traffic is either switched or routed over the fabric, encapsulated with segment IDs, which in one embodiment may be VXLAN segment IDs. A tenant may be allocated one or more VLANs on a leaf node to which the virtual machines (VMs) of the VLAN are connected. Each VLAN is associated with a layer 2 ("L2") segment ID, which is used to encapsulate traffic switched over the fabric. In addition, a tenant may be associated with a VRF on the leaf node. The IP packets of a tenant may be forwarded over the IP fabric based on lookups in its VRF. Each VRF is associated with a layer 3 ("L3") segment ID, which is used to encapsulate traffic routed over the fabric. Simplified fabric management and automatic provisioning are important aspects of DFA fabrics. In one embodiment, a network manager, such as Data Center Network Management ("DCNM"), available from Cisco Systems, Inc., of San Jose, Calif., may serve as a central point of management ("CPOM") for ease of operation.

In general, DCNM provisions and optimizes the overall uptime and reliability of data center fabrics. DCNM may further provide self-service provisioning of intelligent and scalable fabric, centralize fabric management to facilitate resource moves, additions, and changes, proactively monitor the Storage Area Network ("SAN") and Local Area Network ("LAN") and detect performance degradation, and open application programming interfaces ("APIs") for management and orchestration platforms. The DCNM may further ease diagnosis and troubleshooting of data center outages and simplify operational management of virtualized data centers.

In order to offer node-level redundancy and achieve greater scalability, in light of the fact that there is a maximum limit on the number of VRFs a node can support (e.g., typically 1 k-4 k), VRFs need to be configured on multiple BL nodes. A network administrator performing such configuration manually may need to make additional decisions regarding where and how many nodes on which to configure a new VRF. The network administrator may want to take into account various criteria, such as current load on BL nodes, BL node capacity, etc., and issue several commands before coming to a final decision. In the case of a two box solution in which a DCI box is also involved, the number of nodes that need configuration gets doubled. It is important that the configuration is consistent across multiple nodes; therefore, performing this process manually is error-prone.

Embodiments described herein support touchless DCI orchestration for DFA fabric interconnects, covering node selection triggered by VRF creation, push model and restart handling. In one such embodiment, a user plans the number of BL/DCI nodes that will be provided, the number of VRFs per node, the number of BL/DCI pairs each VRF will use (i.e., the "redundancy factor"), and the identity of the link(s) between the BL node and the corresponding DCI node (if a two box solution is implemented). All of this information is stored in the network fabric CPOM or equivalent management station. The CPOM provides an API that can be invoked by an orchestration tool, which may be implemented using any orchestration tool, such as VMware vCloud Director ("vCD") or Openstack. Upon receiving a VRF creation message, the CPOM selects a BL/DCI node on which the VRF will reside. It will be noted that more than one pair can be selected based on the redundancy factor. It will be noted that the CPOM may be implemented using Cisco's DCNM.

The default algorithm for load balancing VRFs over available nodes is round robin. The BL node selection algorithm can be tailored based on user-specific requirements, or even directly from a user script. The CPOM populates a configuration profile in a network asset database ("ADB"), which can be a Lightweight Directory Access Protocol ("LDAP") database or other kind of database. The configuration profile contains the configuration information for the tenant to achieve connectivity between DFA fabrics. The information includes the logical interface to be used between a BL node and a corresponding DCI box, and BGP configuration parameters like route-target that are needed to establish BGP session with the peer. The CPOM then issues a notification to the nodes assigned for the VRF. This notification may (but is not required to) be in the form of a Command Line Interface ("CLI") command over a direct Secure Shell ("SSH") session to the assigned nodes. The key supplied to the nodes is the VRF name and node identifier ("node ID"). In one embodiment, the management IP address of the node functions as the node ID. The node then queries the ADB using the VRF name and node ID as a key. The ADB responds with a configuration profile name and a set of arguments to create a configuration based on the configuration profile. The configuration profile itself can be present at the node via Power on Auto Provision ("POAP") or can be retrieved from the ADB if it is not already present. If the VRF has not yet been created on the BL node, the BL node will also poll the ADB to obtain tenant configuration information necessary for intra-fabric communication. For a node that do not support configuration profiles, the CPOM may send all of the configuration commands to the node.

In the foregoing manner, the configuration process may be completely automated. Assigning the task to a central point of management that has access to current status of all nodes (such as the CPOM), enables the use of many useful heuristics for assigning a BL/DCI node for a VRF in an optimal manner. Such heuristics may include, but are not limited to, CPU load, link bandwidth utilization, node capacity based on device type, among others. The embodiments described herein support restart for BL/DCI nodes. For example, when a BL or DCI node restarts, it may query the ADB with its node identifier (e.g., management IP address) as the key. The ADB will return all of the VRFs assigned to the identified node, as well as the configuration profiles of those VRFs. In this manner, nodes can relearn their VRF configuration on restart.

The embodiments described herein support restart for BL/DCI nodes. For example, when a BL or DCI node restarts, it may query the ADB with its node identifier (e.g., management IP address) as the key. The ADB will return all of the VRFs assigned to the identified node, as well as the configuration profiles of those VRFs. In this manner, nodes can relearn their VRF configuration on restart.

Referring now to FIG. 1, illustrated therein is a simplified block diagram of an example communications system 10 in accordance with embodiments described herein. As shown in FIG. 1, the system 10 comprises three DFA fabrics, respectively designated by reference numerals 12A, 12B, and 12C. In one embodiment, the fabrics 12A-12C are geographically dispersed. For example, fabric 12A may be located in Washington, D.C., fabric 12B may be located in Mumbai, India, and fabric 12C may be located in Beijing, China. In other embodiments, one or more of the fabrics 12A-12C may be located in the same geographic area. Each of the fabrics 12A-12C comprises a plurality of leaf nodes 14, which in certain embodiments comprise network switching or routing elements. The leaf nodes 14 of each fabric 12A-12C connect to a respective compute network 16, each comprising a plurality of servers for hosting virtual machines ("VMs") or physical servers. Each of the leaf nodes 14 is connected to each of a plurality of spine nodes 18.

As previously noted, the leaf nodes 14 may be implemented as switching elements, such as Top of Rack ("ToR") switches, which may be located in a rack unit (not shown) that houses one or more network compute elements, such as physical servers, collectively represented in FIG. 1 by compute network 16. Each leaf node is connected to each of the spine nodes, which may be implemented using routers or switches, and is configured to route communications between the physical servers comprising the compute element in the rack unit and other network elements. Although not shown, it will be recognized that each of the physical servers of the compute network 16 may have instantiated thereon one or more virtual switches for hosting virtual machines ("VMs"). Virtual switches and VMs may be created and run on each physical server on top of a hypervisor installed on the server. Each virtual switch may be configured to manage communications of VMs in particular virtual networks and/or subnetworks ("subnets"). Virtual switches may be embodied as software stored and executed on the corresponding physical server. Thus, the virtual switch performs functions of a physical switch device. Similarly, each VM may comprise software stored and executed on the corresponding physical server. The VMs are configured to exchange communications with other VMs via the system 10. It may be appreciated that any number of physical servers hosting any number of virtual switches and VMs may be present in the system 10. In addition, as previously noted, compute network 16 may include only bare blade/physical servers and may be devoid of VMs.

Referring again to leaf nodes 14, each leaf node is responsible for managing communications (e.g., routing and forwarding) originating from and destined for compute node to which it is connected. Leaf nodes 14 may be used to provide redundancy and fault-tolerance for communications associated with physical servers, virtual machines and virtual switches in the rack. As stated above, physical servers of the compute network 16 host VMs. VMs may exchange communications (e.g. data packets) with other VMs in the system 10 via leaf nodes. Each VM is a member of a tenant network, which is a unique L3 subnet that may contain one or more VLANs. For example, a tenant "Company A" may have two tiers/tenant networks; namely 1.1.1.0/24 and 2.2.2.0/24. A tenant network, or subnet, can span multiple VLANs. As the tenant network of which VM is a member, it may be provisioned with certain network attributes in order to exchange data packets. For example, upon instantiation, a tenant network and a VM therein may be provisioned with virtual network segmentation resources, for example the VM and tenant network may be associated with one or more virtual Local Area Network (VLAN) identifiers, and a subnet identifier. In one example, virtual network segmentation resources may be provisioned on a per-switch or per-port basis (e.g., up to four thousand VLANs per switch or four thousand per port of a switch). Thus, when a tenant network and VM therein are created, a ToR switch may select an unused VLAN for a given segmentation assignment. The virtual segmentation resources may also include a Switch Virtual Interface (SVI) assignment, an Access Control List (ACL) assignment, a Quality of Service (QoS) assignment, a Virtual Routing and Forwarding (VRF) assignment, etc. It may be appreciated that other network information now known or heretofore contemplated may also be assigned to the VM. Each tenant network is also associated with a segment identifier (segment ID), which is used to uniquely identify the tenant network in a particular fabric. A segment ID is a 24-bit identifier that allows 16 million unique tenant networks to be addressed. VXLAN is a specific MAC over IP/UDP encapsulation scheme that also has a VNI (virtual network identifier) which also happens to be 24-bits. However, the term "segment" as used herein is more generic than a VNI in that it is an identifier, but it does not dictate that the encapsulation should be VXLAN or any other encapsulation scheme.

Referring again to FIG. 1, in accordance with features of embodiments described herein, each of the fabrics 12A-12C includes one or more BL nodes 20, each of which is connected to a DCI node 22. Although the BL/DCI node combinations illustrated in FIG. 1 as comprising separate nodes 20 and 22, in some embodiments, the BL/DCI functionality may be integrated into a single device, or node. The DCI nodes 22 connect their respective fabrics 12A-12C to an inter-datacenter core, which may be an MPLS/IP network, 24.

Figure 2:
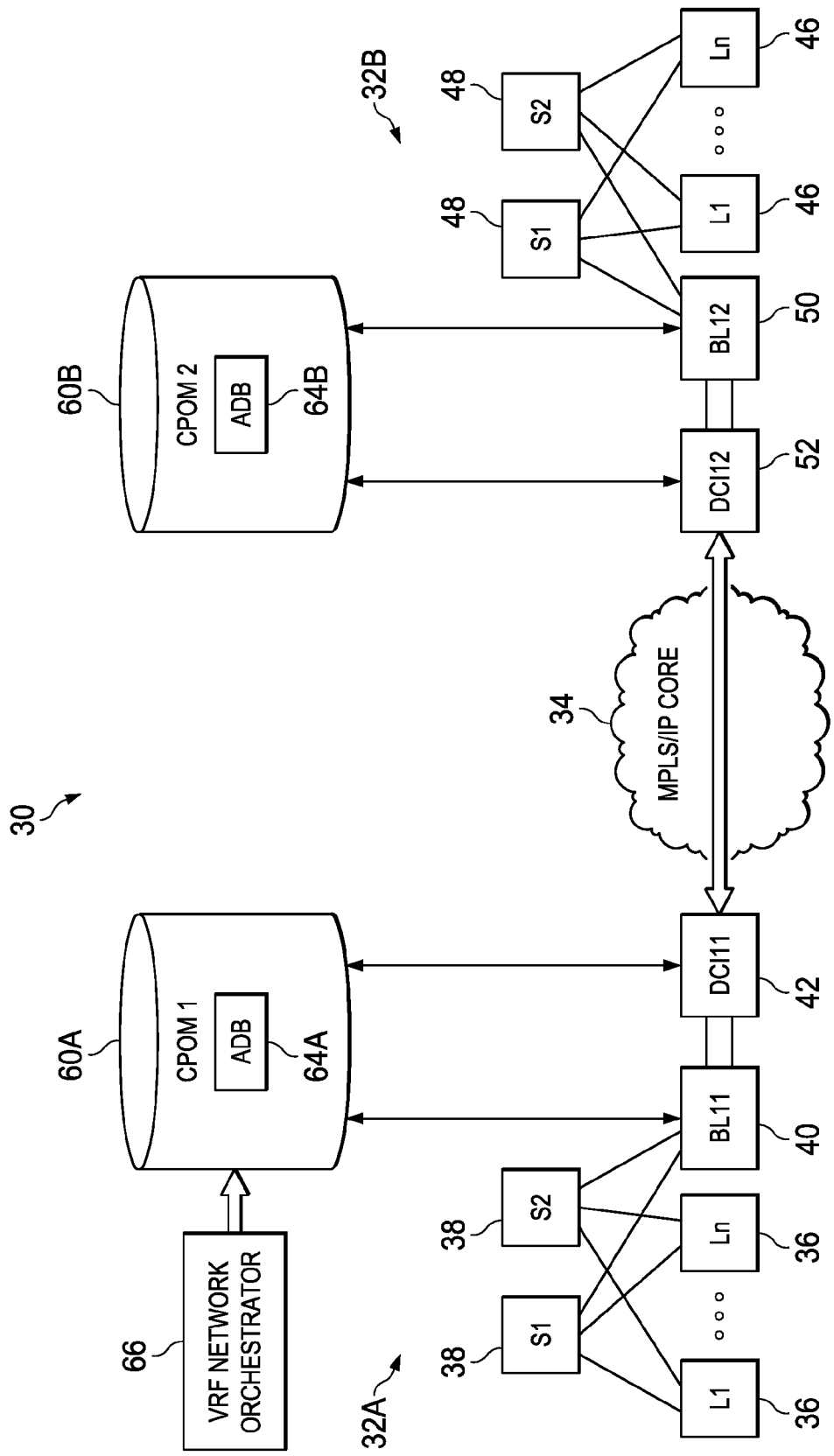
FIG. 2 is another simplified block diagram illustrating an example deployment of a system for implementing touchless orchestration for L3 DCI in a communications network in accordance with features of an embodiment.

Referring now to FIG. 2, illustrated therein is a more simplified block diagram of a portion of a system 30 embodying features of touchless orchestration for L3 DCI techniques described herein. The system 30 comprises two fabrics 32A, 32B, interconnected by an MPLS/IP core network 34. Fabric 32A includes a plurality of leaf nodes, represented in FIG. 2 by leaf nodes 36, each of which are connected to each of a plurality of spine nodes, represented in FIG. 2 by spine nodes 38. A BL node 40 is also provided and connected to each of the spine nodes 38. As with system 10 (FIG. 1), a two box solution is implemented in the fabric 32A, such that a separate DCI node 42 is provided and connected between the BL node 40 and core network 34. Similarly, fabric 32B includes a plurality of leaf nodes, represented in FIG. 2 by leaf nodes 46, each of which are connected to each of a plurality of spine nodes, represented in FIG. 2 by spine nodes 48. A BL node 50 is also provided and connected to each of the spine nodes 48. As with system 10 (FIG. 1), a two box solution is implemented in the fabric 32B, such that a separate DCI node 52 is provided and connected between the BL node 50 and core network 34.

As shown in FIG. 2, each of the fabrics 32A, 32B, is provided with a respective CPOM 60A, 60B. Each CPOM 60A, 60B, comprises functionality equivalent to a network management system, such as DCNM, and an Asset Database ("ADB") 64A, 64B, for purposes that will be described in greater detail below. It will be noted that, although ADBs 64A, 64B, are shown in FIG. 2 as being integrated with respective CPOM 60A, 60B, the ADBs may comprise separate components accessible by the respective CPOM via an appropriate connection. A VRF network orchestrator 66, which may be implemented using vCD or Openstack, for example, is also provided for initiating VRF creation, deletion, and modification in the system 30.

As will become more apparent below, the primary components of the touchless DCI orchestration system described herein include (1) a CPOM, such as CPOM 60A, 60B; (2) an asset database, such as ADB 64A, 64B; and (3) network nodes (e.g., BL nodes 40, 50, and DCI nodes 42, 52). In summary, the CPOM (or equivalent management station) provides users with a GUI through which details of network resources are entered. CPOM may assign VRFs to nodes, populate ADB with VRF configuration profiles and configuration arguments, and notify network nodes of VRF assignment. The ADB may serve as a repository of VRF information and respond to network node queries regarding a particular VRF or all VRFs assigned to the node. The network nodes listen for CPOM triggers for creation, modification, and deletion of VRFs therefrom. The network nodes may also query the ADB to obtain VRF details upon a creation notification, apply the configuration arguments to the provided configuration profile, and query the ADB on restart.

It will be noted that a DCI node in one fabric communicates with a DCI box in other fabrics via Border Gateway Protocol ("BGP")/MPLS VPNs. In order to maintain a common view of which VRF's routes are being exchanged, a variety of techniques may be used. For example, a CPOM may assign BGP route targets ("RTs") used in all DFA clusters for DCI purposes. The central server will then maintain the RT database indexed by VRF name. When a new VRF is configured, the CPOM for the cluster will query the central server to obtain a new RT by providing the VRF name. The RT will then be installed in the ADB by the CPOM and passed on to network nodes upon query. Additionally and/or alternatively, a protocol enhancement to BGP may be employed by introducing a concept of extensible RT. By mapping the RT directly from the VRF name, each DFA cluster can independently derive the same RT for the same VRF.

Figure 3:
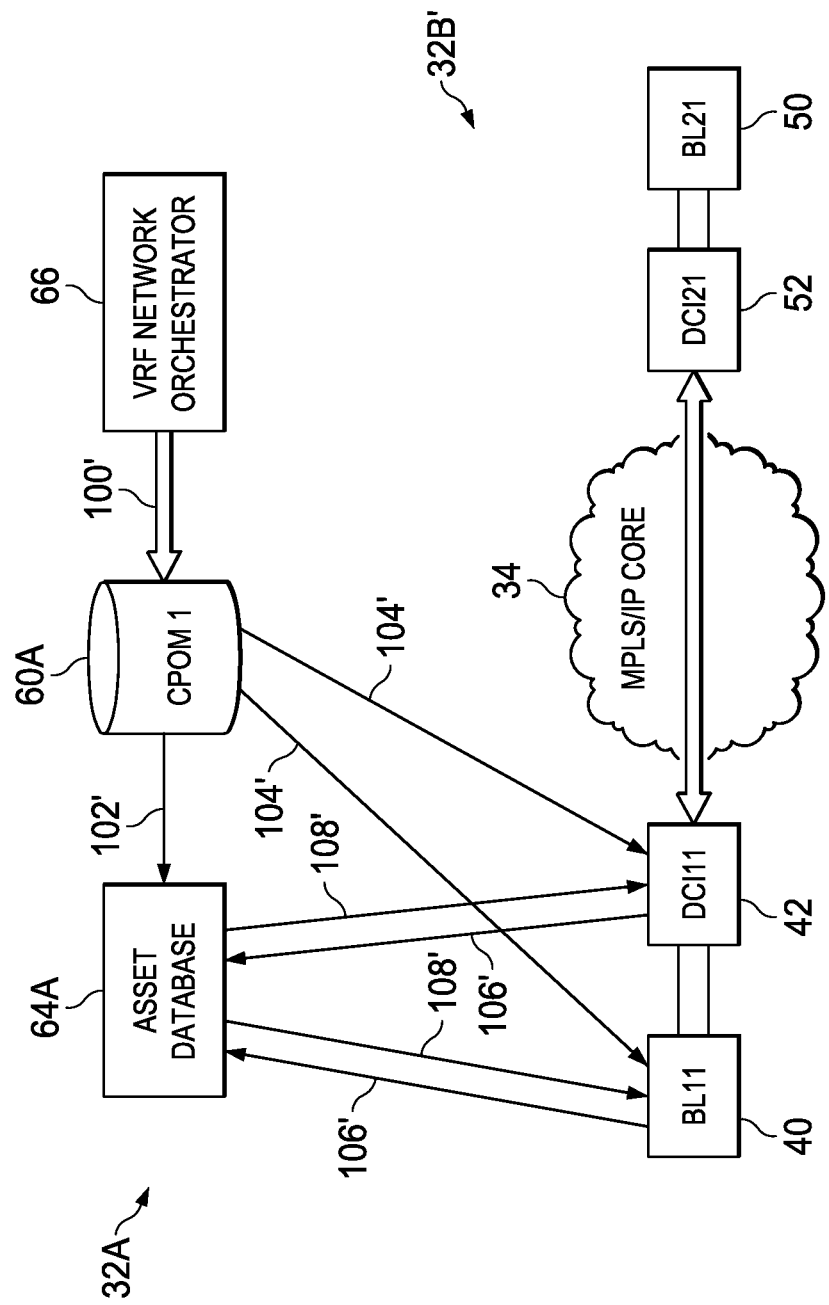
FIG. 3 is a more simplified version of the block diagram of FIG. 2 illustrating an example deployment of a system for implementing touchless orchestration for L3 DCI in a communications network in accordance with features of an embodiment.
Figure 4:
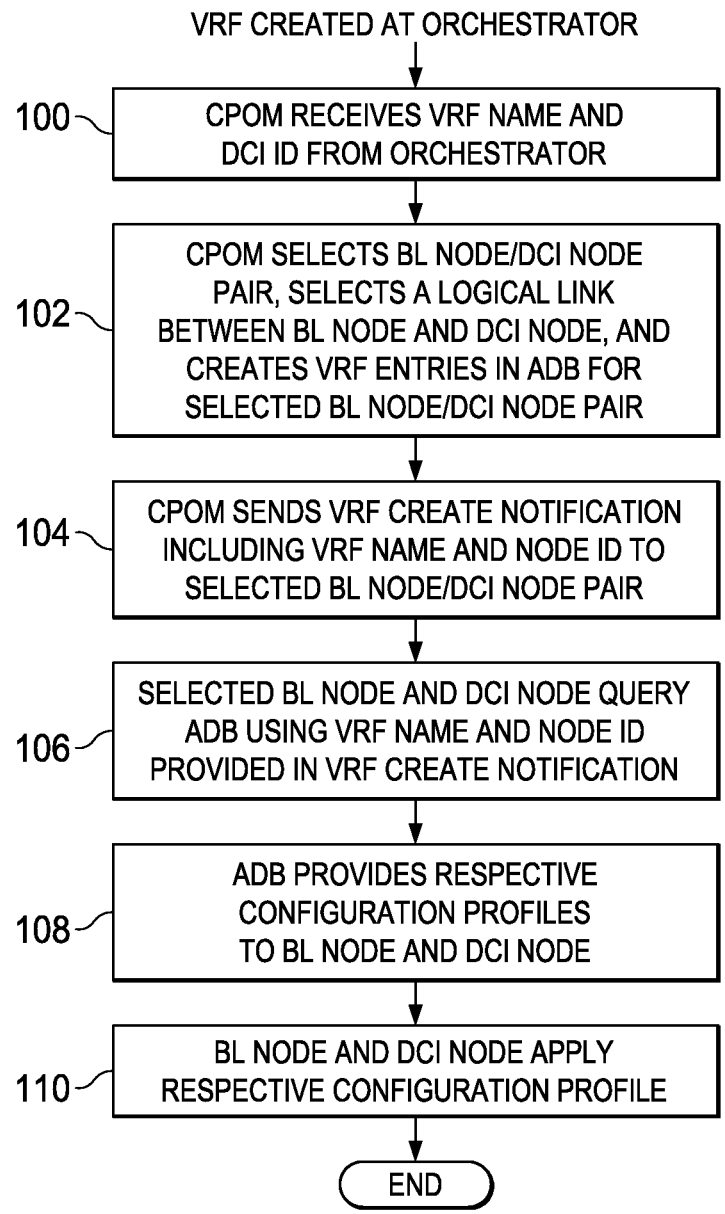
FIG. 4 is a flowchart illustrating operation of a process for implementing touchless orchestration for L3 DCI in a communications network in accordance with features of an embodiment.

Referring now to FIG. 3, illustrated therein is a more simplified block diagram of the system 30 shown in FIG. 2 including only those elements relevant to explaining an embodiment of touchless orchestration for L3 DCI techniques described herein. For purposes of illustration and explanation only, the ADB 64A is illustrated as being independent from the CPOM 60A in FIG. 3. Operation of an embodiment for implementing touchless orchestration for L3 DCI techniques described herein will be explained with reference to FIG. 3 and FIG. 4. As shown in FIG. 4, in step 100, responsive to notification from the orchestrator (e.g., orchestrator 66 (FIG. 3)) that a new VRF has been created, the VRF name and DCI ID is passed to the CPOM (e.g., CPOM 60A). This step is illustrated in FIG. 3 by an arrow 100'. In one embodiment, the DCI ID is a number entered on the CPOM or orchestrator. A reserved value (e.g., zero) is used to indicate that the user does not want the VRF to span multiple fabrics. In step 102, the CPOM selects a BL node/DCI node pair, selects a logical link between the BL node and the DCI node, and populates a profile in the ADB for the selected pair. This step is illustrated in FIG. 3 by an arrow 102'. It will be recognized that, based on user redundancy specifications, more than one BL node/DCI node pair may be selected in step 102. The default algorithm for load balancing VRFs over available node pairs is round robin; however, the selection algorithm can be customized based on user-specific requirements. The ADB profile populated in step 102 contains configuration information for the tenant to achieve connectivity between DFA fabrics. The information includes logical interfaces to be used between the BL node and DCI node and BGP configuration parameters, such as RT, that are needed to establish a BGP session with the BL node/DCI node pair peer in another fabric. In particular, the CPOM installs two entries in the ADB; one entry is for the BL node and the other is for the DCI node. The lookup key to the ADB is VRF name plus node IP. FIG. 5 illustrates ADB entries 20, 22, for the DCI node and BL node, respectively.

In step 104, the CPOM sends a VRF create notification, which includes the VRF name and node ID, to the BL node/DCI node pair (e.g., BL node 40/DCI node 41 (FIG. 3)). This step is illustrated in FIG. 3 by arrows 104'. In one embodiment, this is performed via direct SSH to management IP using specially defined CLIs. In step 106, the BL node and DCI node query the ADB using key VRF name and node ID. This step is illustrated in FIG. 3 by arrows 106'. In step 108, the ADB responds to each of the nodes with its respective configuration profile. This step is illustrated in FIG. 3 by arrows 108'. In step 110, the BL node and DCI node each apply their respective profile locally, e.g., by converting the returned profile into CLI commands. This step is not illustrated in FIG. 3, as it occurs internally to the BL node and DC node. Upon completion of step 110, The BL node sends a route refresh command to its Route Reflector ("RR") (not shown in FIG. 3) and the DCI node sends a route refresh command to DCI peers (e.g., DCI node 52 (FIG. 3) via the core network (e.g, network 34 (FIG. 3). In this manner, routes are updated to reflect the new VRF. At that point, BGP sessions between peer DCI nodes come up and orchestration is complete.

It will be recognized that while the process is illustrated in FIG. 3 as occurring only in fabric 32A a similar process occurs simultaneously in other fabrics in the system 30 (e.g., fabric 32B). Other fabrics should use the same DCI ID for the same tenant, unless BGP enhancement using extensible RT is deployed. Moreover, while the FIGURES illustrate a two-box solution, the same mechanisms are applicable to cases in which a one-box solution is implemented.

With regard to VRF deletion, upon receiving notice from the orchestrator that a VRF has been deleted, the CPOM removes the ADB entry for the VRF and reclaims the VRF profile. The CPOM also informs the BL node/DCI node pair of the VRF deletion. Similar to the create notification, the delete notification will include the VRF name and node ID. The BL node and DCI node generate configuration to delete the VRF locally. Additionally, a user can modify various VRF parameters, such as changing the DCI ID (e.g., in case of user input error) and adding or removing support for an address family. With regard to VRF modification, upon receiving notice, either from the orchestrator or directly from a user via the CPOM GUI), that a VRF has been modified, the CPOM modifies the ADB entry for the VRF and informs the BL node/DCI node pair of the VRF modification. Similar to the create and delete notifications, the modify notification will include the VRF name and node ID. The BL node and DCI node generate configuration to delete the VRF locally.

The embodiments described herein comprise mechanisms for automatically selecting BL/DCI nodes upon creation of a new VRF in a DFA fabric and pushing down the required configuration data to the selected BL/DCI nodes, completely automating tenant communication across DFA clusters. The embodiments may allow for smooth recovery when a BL node restarts, thus complementing existing DFA automation processes designed for intra-fabric communication and providing users a simple, easy-to-use, and less error-prone process.

The embodiments complement existing DFA automation mechanisms and collectively enable completely touchless orchestration for inter- and intra-fabric communication. Additionally, the embodiments provide flexibility on choosing a BL node for a tenant. The selection algorithm may be tailored based on customer requirement and can be specified to assigning more than one BL for a particular tenant to load balance and provide redundancy. Still further, embodiments described herein automate configuration of selected BL node and DCI box without user intervention and enable smooth recovery upon node restart/reload. Still further, the embodiments retain the touchless advantage of the overlay scheme and have additional advantages of utilizing the full capabilities of the network device. Different VRFs may be provided different quality of service ("QoS"), customized level of redundancy, access control policies, and others.

In one example implementation, various devices involved in implementing the embodiments described herein can include software for achieving the described functions. For example, referring to FIGS. 2 and 3, the CPOM 60A may be implemented using one or more computer devices comprising software embodied in one or more tangible media for facilitating the activities described herein. The computer device for implementing the CPOM 60A may also include a memory device (or memory element) for storing information to be used in achieving the functions as outlined herein. Additionally, the computer device for implementing the CPOM 60A may include a processor that is capable of executing software or an algorithm to perform the functions as discussed in this Specification, including but not limited to the functions illustrated in and described with reference to FIGS. 3 and 4. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and in FIGS. 3 and 4 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 3 and 4. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices, such as BL nodes, DCI nodes, CPOMs, and orchestrators, can include software to achieve (or to foster) the activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving from an orchestrator element for a new Virtual Routing and Forwarding element ("VRF") created in a communications network a name of the VRF and interconnect identification;
   selecting a border element in a first Dynamic Fabric Automation ("DFA") fabric on which to install the VRF, wherein the selected border element comprises a border leaf node/Data Center Interconnect ("DCI") node pair;
   selecting a logical communications interface to be used between the border leaf node and the DCI node pair;
   creating in a database a VRF entry for the selected border element, the entry identifying a configuration profile for the selected border element, wherein the creating an entry for the selected border element comprises creating an entry for each node of the border leaf node/DCI node pair, wherein each of the entries identifies a configuration profile for a respective one of the nodes of the border leaf node/DCI node pair;

forwarding a VRF create notification to the selected border element; and providing the configuration profile from the corresponding entry to the selected border element in response to a query to the database from the selected border element, wherein the providing the configuration profile comprises providing the respective configuration profile to each of the nodes of the border leaf node/DCI node pair;

wherein the configuration profile includes connectivity information for enabling a tenant of the VRF to achieve connectivity between the first DFA fabric and a second DFA fabric via the border leaf node/DCI node pair, the connectivity information comprising the selected logical communications interface and Border Gateway Protocol ("BGP") configuration parameters necessary for establishing a BGP session between the selected border element and a border element of the second DFA fabric.

2. The method of claim 1, further comprising allocating a network identifier to the VRF.

3. The method of claim 1, wherein the selected border element comprises a border leaf node comprising Data Center Interconnect ("DCI") functionality.

4. The method of claim 1, wherein the query includes a VRF name and a node ID provided to the selected border element in the VRF create notification.

5. The method of claim 1, further comprising, subsequent to restart of the selected border element:

receiving from the selected border element a new query to the database; and providing the configuration profile from the corresponding entry to the selected border element in response to the new query;

wherein the selected border element applies the configuration profile automatically to configure the selected border element.

6. One or more non-transitory tangible media that includes code for execution and when executed by a processor is operable to perform operations comprising:

receiving from an orchestrator element for a new Virtual Routing and Forwarding element ("VRF") created in a communications network a name of the VRF and interconnect identification;

selecting a border element in a first Dynamic Fabric Automation ("DFA") fabric on which to install the VRF, wherein the selected border element comprises a border leaf node/Data Center Interconnect ("DCI") node pair;

selecting a logical communications interface to be used between the border leaf node and the DCI node pair;

creating in a database a VRF entry for the selected border element, the entry identifying a configuration profile for the selected border element, wherein the creating an entry for the selected border element comprises creating an entry for each node of the border leaf node/DCI node pair, wherein each of the entries identifies a configuration profile for a respective one of the nodes of the border leaf node/DCI node pair;

forwarding a VRF create notification to the selected border element; and providing the configuration profile from the corresponding entry to the selected border element in response to a query to the database from the selected border element, wherein the providing the configuration profile comprises providing the respective configuration profile to each of the nodes of the border leaf node/DCI node pair;

wherein the configuration profile includes connectivity information for enabling a tenant of the VRF to achieve connectivity between the first DFA fabric and a second DFA fabric via the border leaf node/DCI node pair, the connectivity information comprising the selected logical communications interface and Border Gateway Protocol ("BGP") configuration parameters necessary for establishing a BGP session between the selected border element and a border element of the second DFA fabric.

7. The media of claim 6, wherein the operations further comprise allocating a network identifier to the VRF.

8. The media of claim 6, wherein the selected border element comprises a border leaf node comprising Data Center Interconnect ("DCI") functionality.

9. The media of claim 6, wherein the VRF create notification includes the VRF name and a node ID and wherein the query includes the VRF name and the Node ID.

10. An apparatus comprising:

a memory element configured to store data;

a processor operable to execute instructions associated with the data; and a central point of management module configured to:

receive from an orchestrator element for a new Virtual Routing and Forwarding element ("VRF") created in a communications network a name of the VRF and interconnect identification;

select a border element in a first Dynamic Fabric Automation ("DFA") fabric on which to install the VRF, wherein the selected border element comprises a border leaf node/Data Center Interconnect ("DCI") node pair;

select a logical communications interface to be used between the border leaf node and the DCI node pair;

create in a database a VRF entry for the selected border element, the entry identifying a configuration profile for the selected border element, wherein the creating an entry for the selected border element comprises creating an entry for each node of the border leaf node/DCI node pair, wherein each of the entries identifies a configuration profile for a respective one of the nodes of the border leaf node/DCI node pair;

forward a VRF create notification to the selected border element; and provide the configuration profile from the corresponding entry to the selected border element in response to a query to the database from the selected border element, wherein the providing the configuration profile comprises providing the respective configuration profile to each of the nodes of the border leaf node/DCI node pair;

wherein the configuration profile includes connectivity information for enabling a tenant of the VRF to achieve connectivity between the first DFA fabric and a second DFA fabric via the border leaf node/DCI node pair, the connectivity information comprising the selected logical communications interface and Border Gateway Protocol ("BGP") configuration parameters necessary for establishing a BGP session between the selected border element and a border element of the second DFA fabric.

11. The apparatus of claim 10, wherein the module is further configured to allocate a network identifier to the VRF.

12. The apparatus of claim 10, wherein the selected border element comprises a border leaf node comprising Data Center Interconnect ("DCI") functionality.

13. The apparatus of claim 10, wherein the VRF create notification includes the VRF name and a node ID and wherein the query includes the VRF name and the node ID.

* * * * *